US010311826B1

(12) United States Patent
Balazs

(10) Patent No.: US 10,311,826 B1
(45) Date of Patent: Jun. 4, 2019

(54) DATA-PRIVACY MANAGEMENT TECHNIQUE

(71) Applicant: INTUIT INC., Mountain View, CA (US)

(72) Inventor: Alex G. Balazs, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 17 days.

(21) Appl. No.: 16/013,268

(22) Filed: Jun. 20, 2018

Related U.S. Application Data

(63) Continuation of application No. 13/754,695, filed on Jan. 30, 2013, now Pat. No. 10,049,411.

(51) Int. Cl.
| | |
|---|---|
| *G06Q 50/00* | (2012.01) |
| *G06Q 30/00* | (2012.01) |
| *G06F 21/62* | (2013.01) |
| *G09G 3/36* | (2006.01) |

(52) U.S. Cl.
CPC ......... *G09G 3/3696* (2013.01); *G06Q 30/018* (2013.01); *G06Q 50/00* (2013.01); *G09G 3/3648* (2013.01); *G09G 3/3659* (2013.01); *G06F 21/6245* (2013.01)

(58) Field of Classification Search
CPC ............................ G06Q 10/101; G06Q 50/01
See application file for complete search history.

(56) References Cited

U.S. PATENT DOCUMENTS

| | | | |
|---|---|---|---|
| 2007/0067297 A1 | 3/2007 | Kublickis | |
| 2007/0067630 A1 | 3/2007 | Lenkov et al. | |
| 2009/0254971 A1 | 10/2009 | Herz et al. | |
| 2012/0297017 A1 | 11/2012 | Livshits et al. | |

*Primary Examiner* — Maria C Santos-Diaz
(74) *Attorney, Agent, or Firm* — Patterson + Sheridan LLP

(57) ABSTRACT

A technique for controlling release of data associated with an account is described. During this data-privacy management technique, a computer system provides at least a subset of data associated with an account to a third party based on a first consent (which may be received from a user of the account). This subset may have a first classification based on a taxonomy. Subsequently, the third party may notify the computer system that additional data has been derived from the data. In response, the computer system may determine a second classification of the additional data based on a taxonomy. If this second classification is other than a subset of the first classification, the computer system may request a second consent (for example, from the user).

15 Claims, 4 Drawing Sheets

DATA-PRIVACY MANAGEMENT TECHNIQUE

RELATED APPLICATIONS

The present patent is a continuation of, and hereby claims priority under 35 U.S.C. § 120 to pending U.S. patent application Ser. No. 13/754,695, entitled "DATA-PRIVACY MANAGEMENT TECHNIQUE," by the same inventor, filed on 30 Jan. 2013 (Client Ref. No.: 137003US; P+S Ref. No.: INTU/0173US).

BACKGROUND

The present disclosure relates to a technique for controlling release of data associated with a computer-based account.

Many computer users enjoy keeping in touch with their friends via computer-based systems, such as social networks. The actions and behaviors of users when using a social-networking application, as well as the information that they post, provides a rich source of data for a provider of the social-networking application. In principle, this data can be used by the provider and their third-party partners to suggest additional products and services to the users, which can generate additional revenue for the provider and their third-party partners.

In order to select the additional products and services (and, thus, to generate the additional revenue), the provider often needs to share the data with the third-party partners. However, the sharing of such personal data often raises privacy concerns and can alienate users.

Currently, most providers of the software applications and services address this issue by asking users to agree or consent to their privacy policy, for example by accepting a privacy-policy consent agreement. Typically, such privacy policies are defined by the providers and, as such, encompass the data that the providers believe is shareable.

However, this approach is subject to obvious conflicts of interest between the providers and the users, and is often inadequate. For example, the third-party partners may modify the data they are given and can generate new data, which may be unknown to the original provider or the users, and may be outside the scope of the privacy-policy consent agreements of the original provider. This can pose legal risks to the original provider, and raises privacy concerns that can alienate the users if they find out about the new data that has been generated.

SUMMARY

The disclosed embodiments relate to a computer system that controls release of data associated with an account. During operation, the computer system receives a first consent for release of at least a subset of the data associated with the account to a third party, where the subset has a first classification based on a predefined taxonomy. Then, the computer system provides the subset of the data to the third party based on the first consent. Moreover, the computer system receives information from the third party about additional data derived from the data by the third party. Next, the computer system determines a second classification of the additional data based on the predefined taxonomy. If the second classification is other than a subset of the first classification, the computer system provides a second consent.

Note that the first consent may be received from a user of the account. Moreover, the second consent may be provided to the user of the account.

In some embodiments, the computer system receives the second consent. Then, the computer system provides authorization to the third party to release the additional data to other parties based on the second consent.

Furthermore, the data includes financial data.

Additionally, the predefined taxonomy may include a hierarchical set of classes and subclasses.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for controlling release of data associated with an account, and a computer-program product (e.g., software) for use with the computer system are described. During this data-privacy management technique, a computer system provides at least a subset of data associated with an account to a third party based on a first consent (which may be received from a user of the account). This subset may have a first classification based on a predefined taxonomy. Subsequently, the third party may notify the computer system that additional data has been derived from the data. In response, the computer system may determine a second classification of the additional data based on a predefined taxonomy. If this second classification is other than a subset of the first classification, the computer system may request a second consent (for example, from the user).

By ensuring that even the additional data derived from an authorized data release is covered by an existing consent or authorization from the user of the account, the data-privacy management technique may ensure that the privacy rights of the user are respected. This may increase the user's confidence that data associated with them will only be used appropriately and with the advanced authorization. As a consequence, the user may be more willing to provide data, which may provide new sources of revenue for a provider of the data-privacy management technique.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
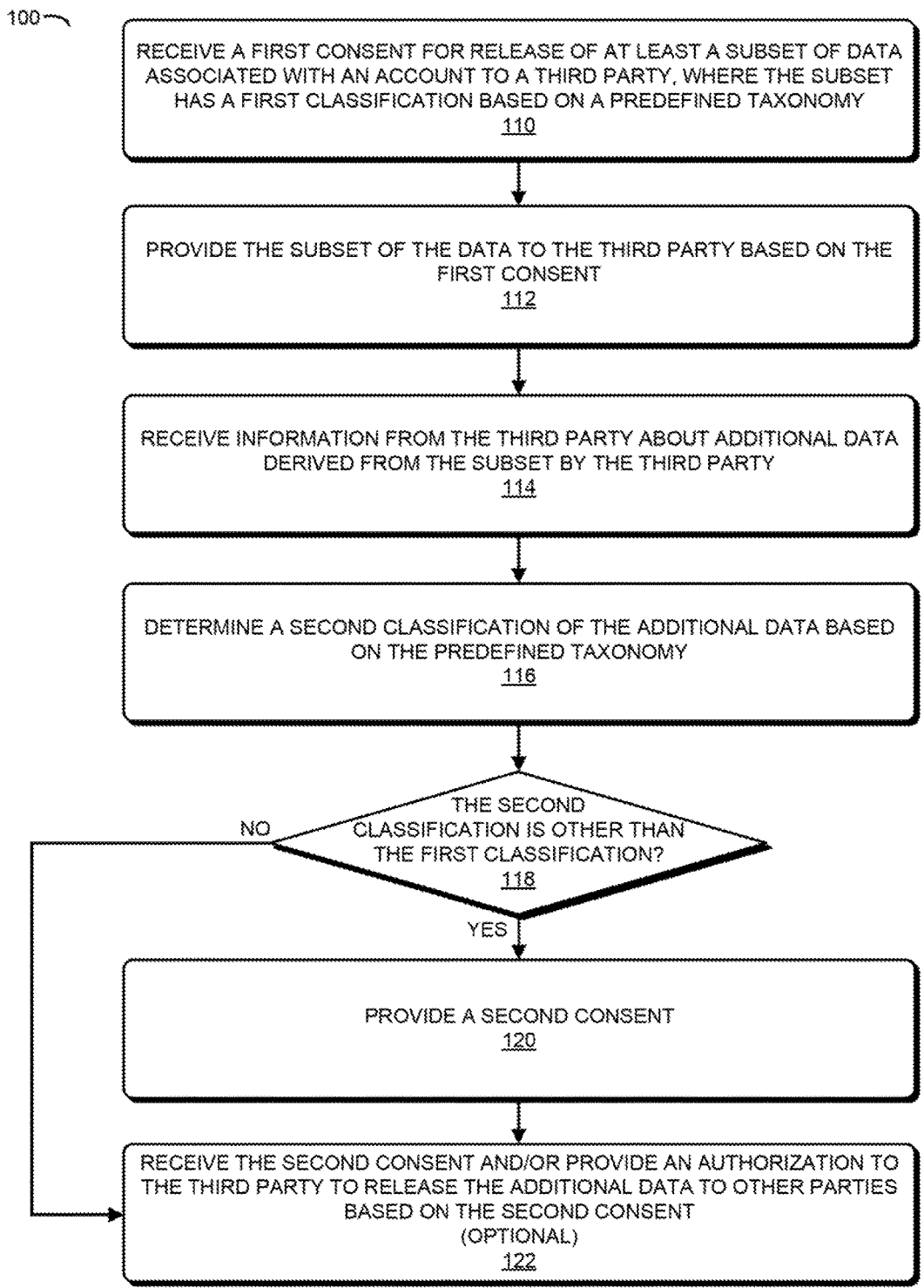
FIG. 1 is a flow chart illustrating a method for controlling release of data associated with an account in accordance with an embodiment of the present disclosure.

We now describe embodiments of the data-privacy management technique. FIG. 1 presents a flow chart illustrating a method 100 for controlling release of data associated with an account, which may be performed by a computer system (such as computer system 400 in FIG. 4). During operation, the computer system receives a first consent for release of at least a subset of the data (such as financial data) associated with the account to a third party, where the subset has a first classification based on a predefined taxonomy (operation 110), such as a hierarchical set of classes and subclasses that are based on shared characteristics. For example, the first consent may be received from a user of the account, and/or the account may be associated with a software application (or a related service) provided by a provider.

Then, the computer system provides the subset of the data to the third party based on the first consent (operation 112). Moreover, the computer system receives information from the third party about additional data derived from the data by the third party (operation 114). Next, the computer system determines a second classification of the additional data based on the predefined taxonomy (operation 116).

If the second classification is other than the first classification, i.e., is other than a subset (operation 118), the computer system provides a second consent (operation 120). For example, the second consent may be provided to the user of the account.

In some embodiments, the computer system optionally receives the second consent (operation 122) and/or optionally provides authorization to the third party to release the additional data to other parties based on the second consent (operation 122).

Note that, once data (such as the subset of the data or the additional data) has been consented to based on the predefined taxonomy, the consent (such as the first consent or the second consent) may be applied in more then one place (such as more than one application or service). For example, a small business owner may consent to access to a customer list when using an application A and when accessing data from service M. If application A requested the customer list from service N, the data-privacy management technique may also grant access because the consent is based on data taxonomy (as opposed to the particular service from which the data is requested).

Moreover, the data-privacy management technique can readily be scaled as additional services are included. In particular, by specifying the the data that a service exposes (via its taxonomy), consented data can be made available to users of this service. Furthermore, the data-privacy management technique may map and enforce taxonomy on new or additional services as new taxonomies (corresponding to new or additional data types or fields) are defined.

Figure 2:
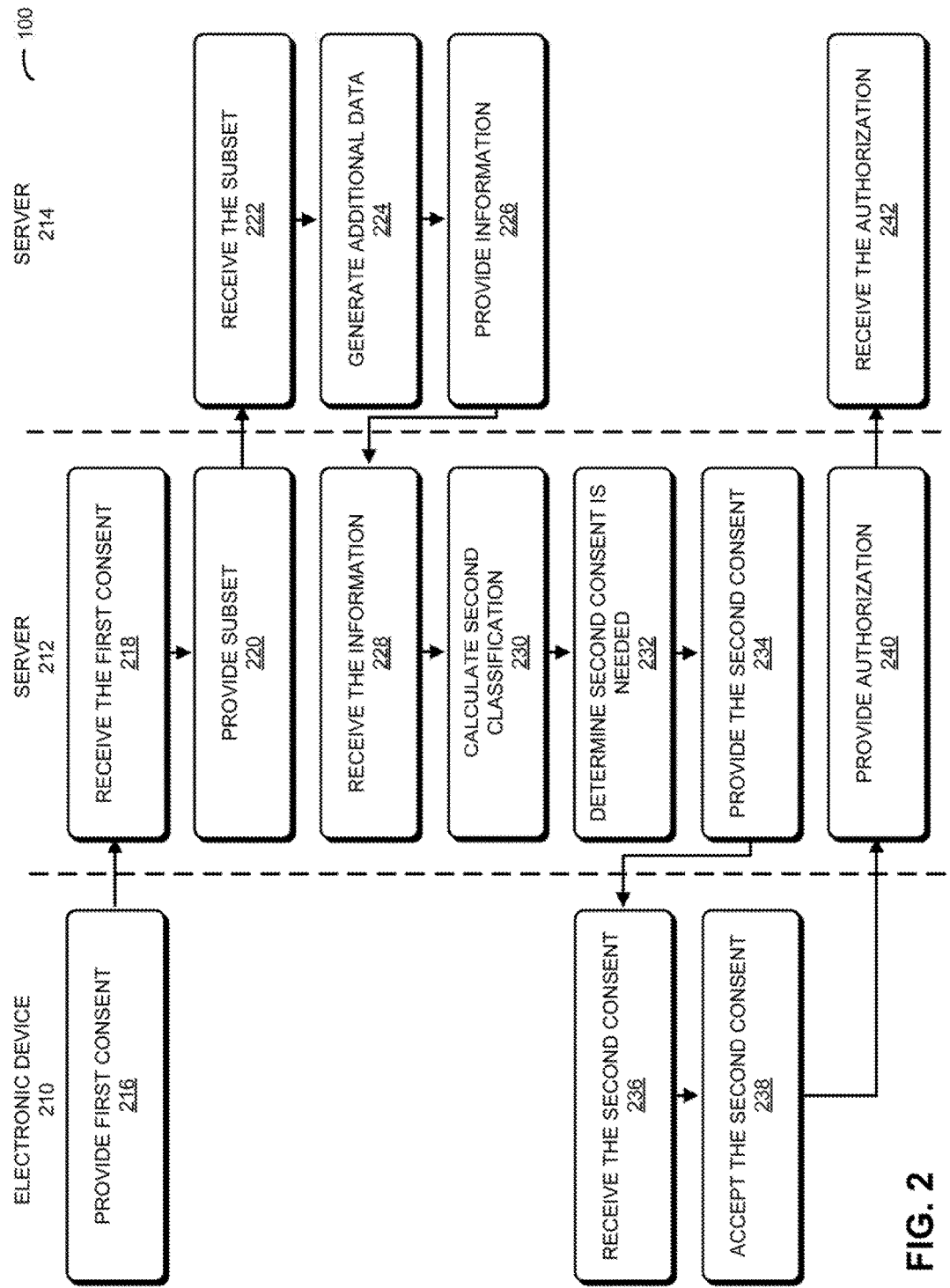
FIG. 2 is a flow chart illustrating the method of FIG. 1 in accordance with an embodiment of the present disclosure.

In an exemplary embodiment, the data-privacy management technique is implemented using an electronic device (such as a computer or a portable electronic device, e.g., a cellular telephone), and at least one server, which communicate through a network, such as a cellular-telephone network and/or the Internet (e.g., using a client-server architecture). This is illustrated in FIG. 2, which presents a flow chart illustrating method 100 (FIG. 1).

During the method, a user of electronic device 210 may provide the first consent (operation 216), which may be received (operation 218) by server 212, which may be associated with a provider of a software application or a service. For example, as described below with reference to FIG. 3, the user may use the software application or service via electronic device 210.

In response to receiving the first consent (operation 218), server 212 may provide the subset of the data (operation 220) to server 214, which may be associated with a third party (such as a partner of the provider).

After receiving the subset (operation 222), server 214 may generate additional data (operation 224) based on or derived from the data. When this occurs, server 214 may provide information (operation 226) about the additional data, which may be received (operation 228) by server 212.

Then, server 212 may calculate the second classification (operation 230) of the additional data, and may determine that the second consent is needed (operation 232). Next, server 212 may provide the second consent (operation 234), which may be received (operation 236) by electronic device 210.

Subsequently, after the user of electronic device 210 accepts the second consent (operation 238), server 212 may provide the authorization (operation 240), which may be received (operation 242) by server 214.

In some embodiments of method 100 (FIGS. 1 and 2), there may be additional or fewer operations. Moreover, the order of the operations may be changed, and/or two or more operations may be combined into a single operation.

In an exemplary embodiment, the data-privacy management technique is used to allow customer data to be shared broadly, while allowing the customer to control who can see the data, as well as additional data derived or generated from the data. In this way, additional products and services can be created while giving the customer choice. This privacy policy may allow the customer to feel secure and respected, and therefore may not run a risk of alienating the customer.

The data-privacy management technique may be based on a taxonomy driver that is used to classify the data and the additional data to determine their relationships to each other (stated differently, it provides a framework for describing data and, thus, interrelationships among the data). If the additional data is a subset of the classification of the data, then no additional consent is needed. However, if the classification of the additional data is distinct from the classification of the data, then an additional consent may be requested. In this way, the data-privacy management technique may provide an extensible data and consent framework.

For example, the original data covered by a customer consent may be their 'core' income-tax data. The taxonomy driver may be used to define a hierarchical set of classes and subclasses based on shared characteristics of the income-tax data. Thus, there may be a class for personal income-tax data and a class for business income-tax data. Moreover, there may be subclasses of the personal income-tax data, including: W2, 1099, etc. Furthermore, there may be subclasses for income-tax data associated with different platforms (desktop versus portable electronic device), as well as software from different providers.

While the preceding example illustrated the taxonomy based on the customer income-tax data, the taxonomy may also be based on the applications that use the customer income-tax data. For example, there may be classes for: an income-tax application, an income-tax application that executes on a portable electronic device (such as a cellular telephone), financial software (such as planning software capable of processing financial information or payroll or accounting software capable of processing payroll information), software from different providers, software for consumers, software for businesses, a mobile-payment application (such as an application that makes electronic payments from a portable electronic device), etc.

In addition, there may be predefined rules governing consent and when additional consent is needed. For example, the rules may indicate that if new data is generated in a different class or subclass than the original data, a new consent is needed. Thus, if an internal or an external (i.e., one associated with a third-party partner) application uses some of the income-tax data and generates something new, the taxonomy driver can be used to classify the new data and to determine if it falls under the existing consent or if a new consent is needed.

For example, a user may consent to allow an online income-tax application from a provider to access their W2 information. Subsequently, an income-tax application from the provider that executes on a cellular telephone may request access to the W2 information. Because the taxonomy of the requested information is the same, the request falls under the existing consent agreement and is granted.

However, if a mobile-payment application requests access to the W2 information, this request may be denied without another consent from the user because the taxonomy of the application is different from that associated with the original request ('payment' versus 'income tax').

Figure 3:
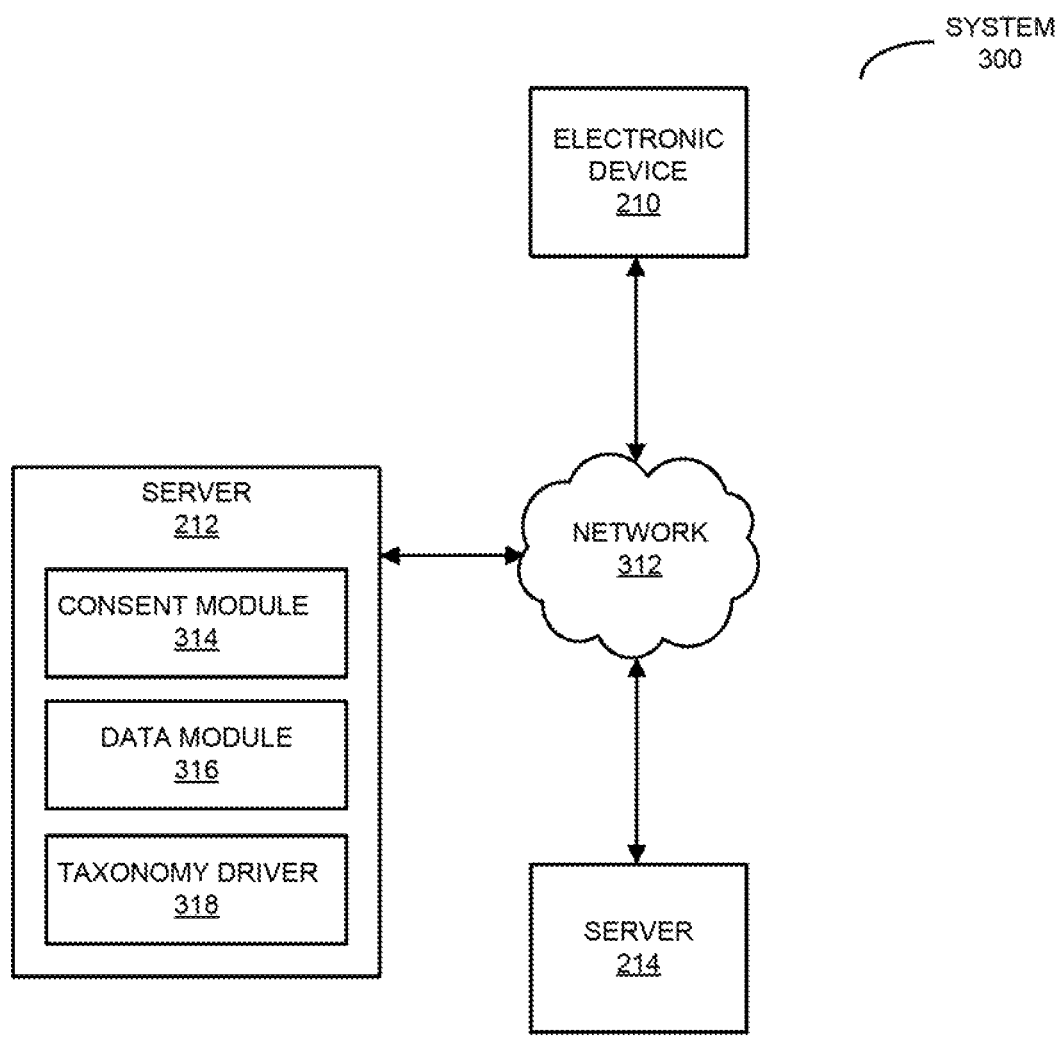
FIG. 3 is a block diagram illustrating a system that performs the method of FIGS. 1 and 2 in accordance with an embodiment of the present disclosure.

We now describe embodiments of a system and the computer system, and their use. FIG. 3 presents a block diagram illustrating a system 300 that can be used, in part, to perform operations in method 100 (FIGS. 1 and 2). In this system, during the testing technique a user of electronic device 210 may use a software product, such as a software application that is resident on and that executes on electronic device 210. (Alternatively, the user may interact with a web page that is provided by server 212 via network 312, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 212 or that is installed and which executes on electronic device 210).

During the data-privacy management technique, a consent module 314 on server 212 (which is associated with a provider of the software application) may request and receive a consent from the user of electronic device 210 via network 312. Based on this consent, data module 316 on server 212 may provide the subset of data to server 214 (which may be associated with a third-party partner of the provider) via network 312.

If server 214 generates additional or new data based on or derived from data, server 214 may provide information about the additional data to server 212 via network 312. Using taxonomy driver 318, server 212 may determine if a classification of additional data is encompassed by (i.e., a subset of) a classification of data.

Then, based on predefined consent rules, consent module 314 may determine if the other consent is needed. If yes, consent module 314 may request and receive the other consent from the user of electronic device 210 via network 312. After the other consent is received, or if the other consent is not needed, consent module 314 may provide authorization to server 214 via network 312.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
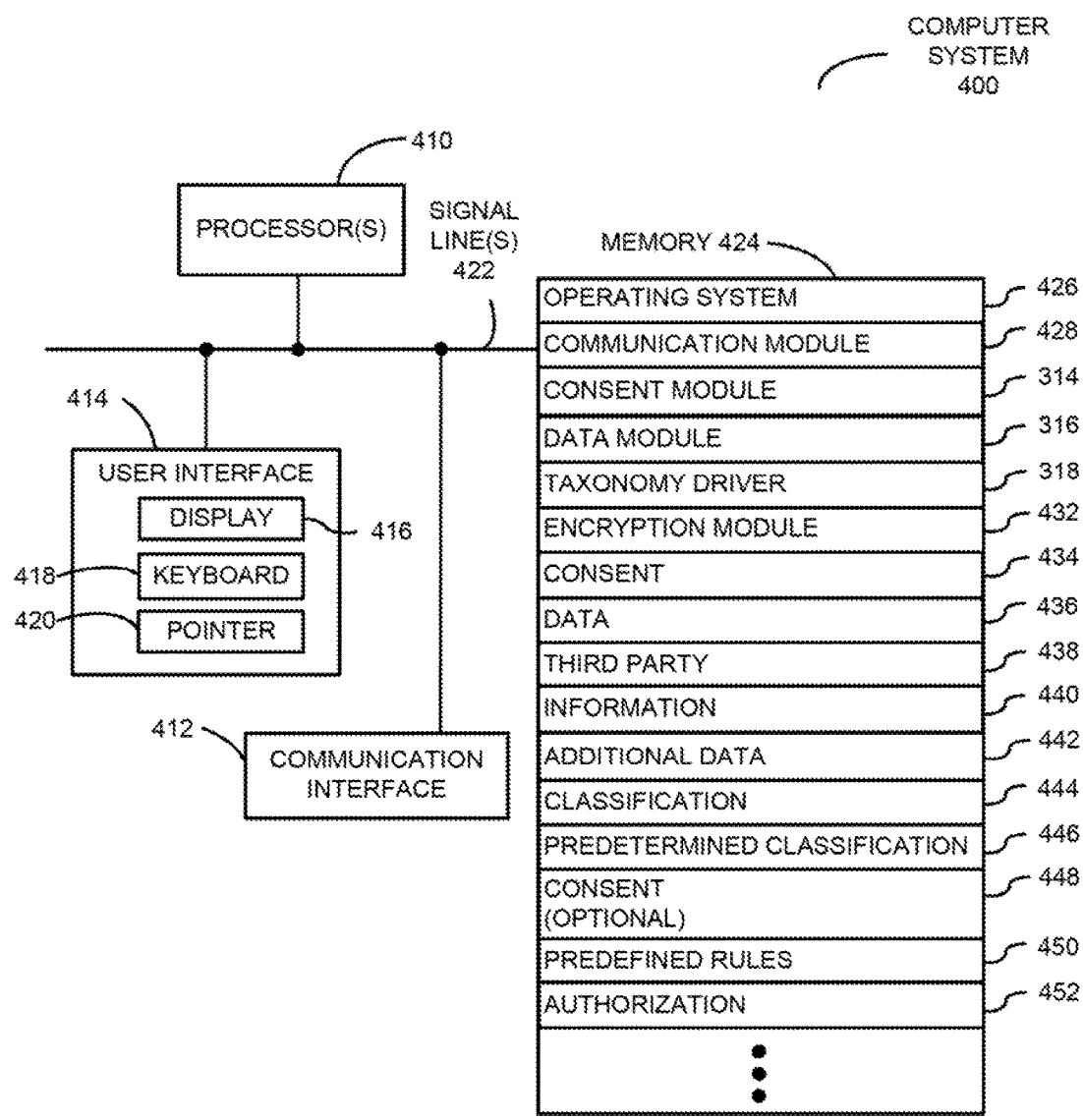
FIG. 4 is a block diagram illustrating a computer system that performs the method of FIGS. 1 and 2 in accordance with an embodiment of the present disclosure.

FIG. 4 presents a block diagram illustrating a computer system 400 that performs method 100 (FIGS. 1 and 2), such as server 212 (FIGS. 2 and 3). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: consent module 314 (or a set of instructions), data module 316 (or a set of instructions), taxonomy driver 318 (or a set of instructions), and/or encryption module 432 (or a set of instructions). Note that one or more of these program modules (or sets of instructions) may constitute a computer-program mechanism.

During the data-privacy management technique, consent module 314 may request and receive consent 434 associated with data 436 from the user via communication module 428 and communication interface 412. Based on consent 434, data module 316 provides a subset of data 436 to a third party 438 via communication module 428 and communication interface 412.

If data module 316 subsequently receives information 440 (via communication module 428 and communication interface 412) from third party 438 that additional data 442 was generated based on or derived from data 436, taxonomy driver 318 may determine classification 444 associated with additional data 442, and may compare classification 444 to predetermined classification 446 associated with data 436.

If classification 444 is not encompassed by predetermined classification 446, consent module 314 may request (via communication module 428 and communication interface 412) optional consent 448 from the user based on predefined rules 450. After optional consent 448 is received, consent module 314 may provide (via communication module 428 and communication interface 412) authorization 452 to the third party.

Alternatively, if classification 444 is encompassed by predetermined classification 446, consent module 314 may provide (via communication module 428 and communication interface 412) authorization 452 to the third party.

Because information used in the data-privacy management technique may be sensitive in nature, in some embodiments at least some of the data stored in memory 424 and/or at least some of the data communicated using communication module 428 is encrypted or decrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In some embodiments, some or all of the functionality of computer system 400 may be implemented in one or more application-specific integrated circuits (ASICs) and/or one or more digital signal processors (DSPs).

Computer system 400, as well as electronic devices, computers and servers in system 300 (FIG. 3), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 3), server 212 (FIGS. 2 and 3), system 300 (FIG. 3), and/or computer system 400 may include fewer components or additional components. Moreover, two or more components may be combined into a single component, and/or a position of one or more components may be changed. In some embodiments, the functionality of electronic device 210 (FIGS. 2 and 3), server 212 (FIGS. 2 and 3), system 300 (FIG. 3) and/or computer system 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments. Moreover, in the preceding discussion a 'subset' of the data should be understood to include some or all of the data.

While the preceding discussion used income-tax data as an illustrative example, in other embodiments the data-privacy management technique may be used with a wide variety of additional types of data (including personal data in social networks) and/or software applications.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for controlling release of data associated with a user of an account, the method comprising:
  receiving the data from the user at a computer;
  defining a taxonomy for the data by defining a hierarchical set of classes and subclasses for the data based on shared characteristics of the data, wherein each class comprises respective subclasses of different electronic platforms utilizing the data;
  receiving, from the user, at the computer, a first electronic consent for release of at least a subset of the data associated with the user to a third party, wherein the subset has a first classification based on the taxonomy;
  storing, in a data structure at the computer, consent-information indicating that the user provided consent for releasing any of the data that has the first classification to the third party;
  receiving a first request for accessing a first subset of the data from a first application of the third party, wherein the first application is executed on a first electronic platform; and
  when the first application falls into one of the subclasses of different electronic platforms that belong to the first classification, providing the first subset of the data to the third party based on the first electronic consent.

2. The method of claim 1, further comprising:
  receiving information from the third party about additional data derived from the first subset of the data by the third party;
  determining a second classification of the additional data based on the taxonomy; and
  if the second classification is other than a subset of the first classification, requesting, from the user, at the computer, a second electronic consent for release of the additional data to one or more other parties.

3. The method of claim 2, further comprising receiving the second electronic consent from the user.

4. The method of claim 3, further comprising providing authorization to the third party to release the additional data to other parties based on the second consent.

5. The method of claim 1, wherein the data includes financial data.

6. A non-transitory computer-readable storage medium storing instructions that, when executed by one or more processors, cause the one or more processors to perform an operation for controlling release of data associated with a user of an account, the operation comprising:
  receiving the data from the user at a computer;
  defining a taxonomy for the data by defining a hierarchical set of classes and subclasses for the data based on shared characteristics of the data, wherein each class comprises respective subclasses of different electronic platforms utilizing the data;
  receiving, from the user, at the computer, a first electronic consent for release of at least a subset of the data associated with the user to a third party, wherein the subset has a first classification based on the taxonomy;

storing, in a data structure at the computer, consent-information indicating that the user provided consent for releasing any of the data that has the first classification to the third party;

receiving a first request for accessing a first subset of the data from a first application of the third party, wherein the first application is executed on a first electronic platform; and when the first application falls into one of the subclasses of different electronic platforms that belong to the first classification, providing the first subset of the data to the third party based on the first electronic consent.

7. The non-transitory computer-readable storage medium of claim 6, wherein the operation further comprises:

receiving information from the third party about additional data derived from the first subset of the data by the third party;

determining a second classification of the additional data based on the taxonomy; and if the second classification is other than a subset of the first classification, requesting, from the user, at the computer, a second electronic consent for release of the additional data to one or more other parties.

8. The non-transitory computer-readable storage medium of claim 7, wherein the operation further comprises receiving the second electronic consent from the user.

9. The non-transitory computer-readable storage medium of claim 8, wherein the operation further comprises providing authorization to the third party to release the additional data to other parties based on the second consent.

10. The non-transitory computer-readable storage medium of claim 6, wherein the data includes financial data, the operation further comprising:

instructions for receiving a first consent for release of at least a subset of the data associated with the account to a third party, wherein the subset has a first classification based on a predefined taxonomy;

instructions for providing the subset of the data to the third party based on the first consent;

instructions for receiving information from the third party about additional data derived from the data by the third party;

instructions for determining a second classification of the additional data based on the predefined taxonomy; and if the second classification is other than a subset of the first classification, instructions for providing a second consent.

11. A computer system, comprising:
one or more processors; and
a non-transitory computer-readable storage medium storing instructions that, when executed by the one or more processors, cause the one or more processors to perform an operation for controlling release of data associated with a user of an account, the operation comprising:

receiving the data from the user at a computer;

defining a taxonomy for the data by defining a hierarchical set of classes and subclasses for the data based on shared characteristics of the data, wherein each class comprises respective subclasses of different electronic platforms utilizing the data;

receiving, from the user, at the computer, a first electronic consent for release of at least a subset of the data associated with the user to a third party, wherein the subset has a first classification based on the taxonomy;

storing, in a data structure at the computer, consent-information indicating that the user provided consent for releasing any of the data that has the first classification to the third party;

receiving a first request for accessing a first subset of the data from a first application of the third party, wherein the first application is executed on a first electronic platform; and when the first application falls into one of the subclasses of different electronic platforms that belong to the first classification, providing the first subset of the data to the third party based on the first electronic consent.

12. The computer system of claim 11, wherein the operation further comprises:

receiving information from the third party about additional data derived from the first subset of the data by the third party;

determining a second classification of the additional data based on the taxonomy; and if the second classification is other than a subset of the first classification, requesting, from the user, at the computer, a second electronic consent for release of the additional data to one or more other parties.

13. The computer system of claim 12, wherein the operation further comprises receiving the second electronic consent from the user.

14. The computer system of claim 13, wherein the operation further comprises providing authorization to the third party to release the additional data to other parties based on the second consent.

15. The computer system of claim 11, wherein the data includes financial data.

* * * * *